(12) United States Patent
Hill (10) Patent No.: US 7,751,674 B2
(45) Date of Patent: Jul. 6, 2010

(54) MODULAR OPTICAL FIBER CASSETTES AND FIBER MANAGEMENT METHODS

(75) Inventor: John Paul Hill, Richfield, MN (US)

(73) Assignee: Clearfield, Inc., Plymouth, MN (US)

( * ) Notice: Subject to any disclaimer, the term of this patent is extended or adjusted under 35 U.S.C. 154(b) by 151 days.

(21) Appl. No.: 12/286,554

(22) Filed: Sep. 30, 2008

(65) Prior Publication Data

US 2009/0097813 A1 Apr. 16, 2009

Related U.S. Application Data

(60) Provisional application No. 60/997,170, filed on Oct. 1, 2007.

(51) Int. Cl.
*G02B 6/00* (2006.01)
(52) U.S. Cl. ...................................... 385/135
(58) Field of Classification Search ................. 385/135
See application file for complete search history.

(56) References Cited

U.S. PATENT DOCUMENTS

| | | | |
|---|---|---|---|
| 4,630,886 A | 12/1986 | Lauriello et al. | |
| 4,708,430 A | 11/1987 | Donaldson et al. | |
| 4,840,449 A | 6/1989 | Ghandeharizadah | |
| 5,129,030 A | 7/1992 | Petrunia | |
| 5,778,130 A | 7/1998 | Walters et al. | |
| 6,768,860 B2 | 7/2004 | Liberty | |
| 6,804,447 B2 | 10/2004 | Smith et al. | |
| 6,909,833 B2 | 6/2005 | Henschel et al. | |
| 6,915,057 B2 | 7/2005 | Vincent et al. | |
| 6,915,059 B2 | 7/2005 | Daoud et al. | |
| 7,142,764 B2 | 11/2006 | Allen et al. | |
| 7,236,677 B2 | 6/2007 | Escoto et al. | |
| 7,260,301 B2 | 8/2007 | Barth et al. | |
| 7,266,280 B2 | 9/2007 | Swenson et al. | |
| 2008/0285933 A1* | 11/2008 | Vogel et al. ................. | 385/135 |

OTHER PUBLICATIONS

International Search Report and Written Opinion for related PCT Application Serial No. PCT/US08/011308, mailed Apr. 16, 2009. (10 pgs.).

* cited by examiner

*Primary Examiner*—Jerry T Rahll
(74) *Attorney, Agent, or Firm*—Brook, Cameron & Huebsch, PLLC (57) ABSTRACT

The present invention provides modular cassettes for fiber management applications. Cassettes in accordance with the present invention comprise plural functional components that nest into a main housing portion to support various application and fiber types. In accordance with the present invention, such components can be added or removed depending on the application and configuration needs of the use environment. Advantageously, cassettes in accordance with the present invention incorporate resilient connections and nested internal components for easy assembly and disassembly with minimal tools.

20 Claims, 8 Drawing Sheets

MODULAR OPTICAL FIBER CASSETTES AND FIBER MANAGEMENT METHODS

CROSS REFERENCE TO RELATED APPLICATIONS

The present application claims priority to U.S. Provisional Application No. 60/997,170 filed Oct. 1, 2007, the entire contents of which is incorporated herein by reference for all purposes.

TECHNICAL FIELD

The present invention relates to optical fiber management. More particularly, the present invention relates to modular cassettes for such optical fiber management and related methods.

BACKGROUND

Optical fibers are increasingly preferred over copper wires for the transmission of telecommunication signals and other data. Once used only in specialized, high-density applications, optical fiber networks are increasingly being used to provide signal transmission between service providers and users such as homes and businesses, for example. Optical fiber telecommunications systems often provide connections for telephone systems, video systems, computer networks, and other such systems.

Compared to conventional copper wiring, the physical routing of optical fibers, known as cable management is an area of significant concern in designing optical fiber equipment, due primarily to signal losses, fracturing, or breakage, which can occur when an optical fiber is bent too sharply. Each fiber has a minimum bend radius, which may not be exceeded without risking signal loss or other damage to the fiber. In addition, the fibers may be damaged if they are subjected to excessive tension or physical impact from external sources.

Optical fiber connection apparatuses, also known as outside plant distribution cabinets, distribution frames, or patch panels, are used wherever the interconnection or cross-connection of multiple optical fibers is required, such as where an optical fiber cable comprising numerous individual fibers enters a distribution cabinet, fiber frame, or patch panel for connection to the individual optical fibers that provide service to homes or businesses, for example. Due to space limitations, it is often desirable that such connection apparatuses allow for the interconnection of a large number of individual fibers in as small a space as possible, thus requiring a high density of connections. It is also desirable to make the work of technicians installing and servicing the connection apparatuses and associated optical fibers as simple as possible. Many patch panels are simply an open planar array of fiber optic adaptors, each of which allows the interconnection of two optical fibers by plugging specially tailored connectors into opposite ends of the adapter. The fibers can then be routed out of the panel thus allowing a large number of connectors to fit into a smaller patch panel without the routing and tracing of individual fibers becoming too difficult for the technician. It is, however, also necessary that the connection apparatus protect the fibers and connectors from damage due to excessive bending, excessive tension, or physical damage from the external environment.

A number of optical fiber cross-connect units are known in the prior art, which attempt to address the above-described problems through the use of protective shrouds or doors. Traditional central office fiber management uses a fixed bulkhead design and costly radius and physical fiber protection inside an overall housing. Examples of such prior art can be found in U.S. Pat. Nos. 7,266,280, 7,260,301, 6,915,059, 6,768,860, 5,778,130, 5,129,030, 4,708,430 and 4,630,886. While these apparatus provide some protection to the connectors and fibers, the fibers may then typically be routed only through the top and bottom of the unit or only through slots in the side of the unit. Density is therefore sacrificed to gain protection of the connectors and fibers.

As the prior art demonstrates, it has become problematic to address the multiple needs of an optical fiber interconnect device. For example, it is difficult to achieve high connection density, allow access to the front or rear of the connection panel, including both sides of the interconnecting adapter, for installation and maintenance activities, and protect the fibers and connectors from excessive bending, excessive tension, and mechanical damage from external sources. Moreover, it is challenging to provide an installer a range of options for cable routing from the front of the connection panel to facilitate the tracing of individual optical fibers and their removal or addition from the cable array. A need therefore exists, for an optical fiber management apparatuses that provide high connection density, easy access to the connection panel, protection to the fibers and connectors from excessive bending, stress, and external damage, while at the same time providing an installer a range of options for routing cables.

SUMMARY

The present invention provides modular cassettes and methods for fiber management applications that satisfy all the basic principals of fiber management with such cassettes. Cassettes in accordance with the present invention comprise plural functional components that nest into a main housing portion to support various application and fiber types. In accordance with the present invention, such components can be added or removed depending on the application and configuration needs of the use environment. Advantageously, cassettes in accordance with the present invention incorporate resilient connections and nested internal components for easy assembly and disassembly with minimal fasteners and/or tools.

Cassettes in accordance with the present invention can be used for both inside and outside plant environments. Cassettes in accordance with the present invention are preferably made from materials suitable for harsh outside plant environments. Such cassettes are scaleable to provide a range of port density and application needs. For example, cassettes in accordance with the present invention can be used to easily scale from 12-port wall boxes to 864 cross connects including everything in between. Cassettes in accordance with the present invention support patch only and in-cassette splicing for all cable constructions and environments.

In an aspect of the present invention, a modular optical fiber management cassette for a patch and splice application is provided. The cassette comprises a housing comprising a surface that provides a first level of fiber management and at least one opening that allows entry of an optical fiber cable into the housing; an adaptor plate resiliently connected to the housing and comprising a plurality of optical fiber connectors; a radius limiter nested with and resiliently connected to the housing, the radius limiter comprising a base portion and central hub; a splice tray nested with and resiliently connected to the housing, the splice tray comprising a plurality of splice channels and at least one fiber nest that provides storage of coiled optical fiber, the splice tray comprising a surface that provides a second level of fiber management spaced from the first level of fiber management; and a housing cover resiliently connected to the housing.

In another aspect of the present invention, a modular optical fiber management cassette for a patch only application is provided. The cassette comprises a clear plastic housing comprising a surface that provides a first level of fiber management and at least one opening that allows entry of an optical fiber cable into the housing; an adaptor plate resiliently connected to the housing and comprising a plurality of optical fiber connectors; a radius limiter nested with and resiliently connected to the housing, the radius limiter comprising a base portion and central hub; and a clear plastic housing cover resiliently connected to the housing.

In another aspect of the present invention, a modular optical fiber management cassette for an optical component application is provided. The cassette comprises a clear plastic housing comprising at least one opening that allows entry of an optical fiber cable into the housing and a plurality of mounting regions for attaching an optical component to the housing; an adaptor plate resiliently connected to the housing and comprising a plurality of optical fiber connectors; an optical component attached to the plurality of mounting regions; and a clear plastic housing cover resiliently connected to the housing.

In yet another aspect of the present invention, a method of optical fiber management is provided. The method comprises providing a modular optical fiber management cassette; configuring the modular optical fiber management cassette for one of patch-only, patch and splice, and optical component use; connecting a feed cable to the optical fiber management cassette; and distributing the feed cable with the adaptor plate.

BRIEF DESCRIPTION OF THE DRAWINGS

The accompanying drawings, which are incorporated in and constitute a part of this application, illustrate several aspects of the present invention and together with description of the embodiments serve to explain the principles of the invention. A brief description of the drawings is as follows.

DETAILED DESCRIPTION

The embodiments of the present invention described below are not intended to be exhaustive or to limit the invention to the precise forms disclosed in the following detailed description. Rather the embodiments are chosen and described so that others skilled in the art may appreciate and understand the principles and practices of the present invention.

Components within a fiber management system such as fiber cladding, cable jacketing, splitter packaging as well as the fiber paths within such systems, are designed to protect and reduce the risk of fiber damage. Fiber management that considers several objectives is thus desirable. One objective is to deliver solutions that minimize risk to fiber in the cable plant. An additional objective is to minimize or eliminate deployment and maintenance headaches. Additionally, reducing the cost of broadband deployment by careful attention to not only the reduction of capital equipment costs, but also the operational costs of each every deployment is another objective.

The present invention provides cable management cassettes and management techniques that include one or more of the following capabilities: 1) Using patch and splice to reduce costs without giving up convenience and/or the quality of splicing that traditional patch-only environments provide, 2) Reducing risk by eliminating as much interaction with fiber jumpers and tail as possible, especially those with live traffic on them, and 3) Remembering that the jacket must be considered in an unconditioned outside plant deployment (OSP) deployment.

Building a fiber to the home (FTTH) network is a labor-intensive effort. A significant portion of this labor is associated with the hours it takes a splice crew to perform the tedious work of splicing each individual in-ground/distribution cable to the passive optical network (PON) cabinet. Critical to the control of operational and capital cost controls is a standard splicing methodology that guarantees a timely, quality burn. The splicing of feeder and distribution network fibers to a FTTH-PON cabinet is traditionally done in a splice closure. The closure is installed below grade in a handhole directly beneath the cabinet or in a splice vault near the cabinet. The cabinet is preloaded with a factory terminated OSP stub and enough slack, stored in the handhole or splice vault, to allow for the splicing crew to pull both the cabinet stubs and the in-ground feeder/distribution cables out to a desired area. For comfort, convenience and cleanliness, the best place to perform this tedious work is within a controlled environment like a splice trailer. To allow for this convenience, it is not unusual for stubbed lengths to reach 500 feet.

In an effort to reduce costs (and because in some harsh environmental locations the use of a below grade handlhole or splice vault was not possible), some outside plant planners instituted network designs that eliminated the use of the handhole (or splice vault) and incorporated the splicing directly inside of the cabinet. A patch and splice cabinet typically incorporates hardware within the cabinet to perform cable preparation, cable slack storage and splicing. However, this approach presents trade-offs. The user, because pre-terminated slack storage within the cabinet is limited, is forced to perform splicing activities within close proximity of the cabinet. Often, this distance is 15 feet or less. This is usually not enough distance to use the desired controlled environment splice trailer.

The result is that splicing was being done in open-air environments, not conducive to a quality splice. As an alternative, in an effort to get splicing crews out of an open air environment, other network planners ordered the stubbed lengths of jacketed tight buffered cable at the traditionally longer lengths which created additional undesirable conditions: 1) Longer lengths of distribution style tight buffered cables not necessarily designed for OSP environments and, 2) Larger cabinet sizes to accommodate and safely store slack which limited density of the cabinet and footprint it could satisfy.

In PON environments the present invention allows network engineers to enjoy the cost savings of patch and splice without the historical trade-offs. Fiber management cassettes and methods in accordance with the present invention each provide a complete, cost effective, and turnkey fiber management solution. Advantageously, fiber is protected in sub-units of 12 fibers. Jacketed cable storage is thus eliminated because the 900 micron tight buffers have shed the outer riser-rated jacket in favor of the cassette that protects it not only from human accidental damage but also provides bend radius protection. By eliminating the requirement for jacketed fiber, fiber management cassettes and methods in accordance with the present invention accommodate fiber management needs plus the slack storage required for a 288 home served configuration in just 4 cubic feet of cabinet space. Further, due to the nesting and modular design of the fiber management cassettes of the present invention, splice trays are integrated into the protection of the cassette itself, eliminating the need for space-consuming (and expensive) splice closures. The splicing solution is thus portable. The user can now pull feeder/ distribution cables through the cabinet and as far as OSP slack allows to the splice trailer. Advantageously, the user does not have to manage, at the same time, an OSP tail (from the cabinet) of equal length. The number of splice trays are matched to the cable counts and advantageously nested within fiber management cassettes of the present invention.

Advantageously, a user can splice pre-terminated fiber management cassettes to the network fiber inside a controlled environment. To accommodate high-density environments and/or high fiber counts, fiber management cassettes can be ganged or grouped together allowing the splicer to move from 12 to 144 fibers at a time. This allows the user to splice one sheath at a time matching the OSP fiber count to a ganged cassette block without having to manage capacity and entry/ exit ports associated with a splice closure.

A ganged block of fiber management cassettes in accordance with the present invention eliminates further costs in the splice closure that would have traditionally been used in a patch only environment. The costs of a splice closure loaded with splice trays, slack baskets, and the risk of an un-sealed closure in time can be eliminated. Furthermore, the cumbersome tasks in network design to match cable sheaths and fiber counts inside the closure and the hassle of splitting buffer tubes can be eliminated because the user's cable sheaths will always match the block of fiber management cassettes.

Fiber management cassettes and methods in accordance with the present invention can provide cost savings that are gained without having to sacrifice the ease and convenience of a patch only installation. What the user ends up with is an ultra modular fiber management system wherein feeder/distribution ratios are scalable at a user-defined 12 fibers at a time. Fiber management cassettes in accordance with the present invention provide a patch and splice system that can be used like traditional patch only but has eliminated costs associated with jacketed fiber, the space that was traditionally allocated to store the terminated slack, the cost of a splice case sitting below the cabinet in the handhole, and the size of the handhole necessary because no splice vault is used.

Any optical circuit that is being touched or that is moving is potentially at risk of damage. Thus, solutions that minimize touching and/or moving such circuits are preferred. Fiber management cassettes and methods in accordance with the present invention advantageously reduce the number of touches, re-routes, and the amount of moving fiber. Two areas of fiber management of particular interest are the splitter parking lot and swinging bulkheads.

Fiber management cassettes and methods in accordance with the present invention minimize risk of damage to the splitter module as cassettes can be pre-parked within a disposable, parking block, enabling the user to simply place the splitter into the splitter cage, route the pre-parked jumpers up to the parking block storage area and deploy subscriber circuits from there. This deployment methodology enables the majority of the final destination of each output leg to be touched only once. As subscribers are turned up, each leg is routed to the required port without having to remove a jumper from a bundle of live circuits.

Swinging Bulkheads can help to provide ease of access, but swinging bulkheads have drawbacks. In certain swinging bulkheads it is possible to have 288, 576, or 576 delicate 900-micron fibers moving all at once. Fiber management should be designed to minimize the risk on both sides of the adapter from the feeder to the distribution network. This is true whether a splitter output circuit is parked or in-service. This is especially true for multifiber OSP cables whose buffer tubes have been exposed and removed from the very material designed to protect it and allowed to move with every bulkhead opening.

Fiber management cassettes and methods in accordance with the present invention minimize risk by placing a well-designed OSP assembly with a ruggedized and proven transition into the cabinet. For patch only configurations, the rear door typically does not need to be opened. Buffer tube slack, for patch and splice configurations, is intuitive and fast. The cable is brought to the cabinet where buffer tubes are accessed, exposed to desired length, spliced into fiber management cassettes, and easily slacked stored over radius spools directly adjacent to cassettes thus minimizing risk by minimizing exposed buffer tubes.

The trend in outside plant cabinets is rapidly moving towards bend insensitive glass for the advantages it gives to both the user and the designer of fiber management products. As a result, the 3" bend diameter that was driven as a standard inside of GR-449 for central office mainframes, and that was core to every fiber management design for the last 20 years, seems not to be receiving the scrutiny it once was. Using fiber cabling that utilizes the G-657.A standard creates perception that users mistakenly seem to associate with a "fail-safe" condition.

Bend insensitive fiber (BIF) can be used but bend insensitive fiber has certain limitations. One downside to BIF is that an increasing amount of fiber is often crammed into ever-smaller places and without regard for the need for bend radius protection. Manufactures of fiber management are mistakenly designing route schemes where a jacketed fiber circuit travels over one or more 90-degree edges thinking their bend insensitive fiber can handle it. Initially, a few jumpers can handle this. Over time, as maximum capacity of the fiber management product begins to be reached, weight and friction can affect the long-term reliability as the 90 degree bend can affect even bend insensitive fiber.

Additionally, while the industry moves to this type of glass, and an apparent disregard of the standard, it continues to ignore the effect traditional riser-rated jacket material has on performance in harsh environments. These jacket materials are stiff when cold and will relax when temperatures inside cabinets begin to climb. As thermal coefficient of expansion/contraction takes place through several thermal cycles, the fiber is subject to bend radius violations, which can create unacceptable light conditions. It's during these wide temperature fluctuations that the adherence to a manufacture's routing recommendations within the industry, even for BIF, becomes increasingly important. If a fiber, whether it is BIF or not, is routed with a properly controlled diameter, one need not worry. However, if the fiber is not bend-radius protected, and is subjected to a hard 90-degree turn, or includes a sagging jumper being pushed into a corner, the effect can be a condition of intermittent signal or no signal.

An exemplary fiber management cassette 10 in accordance with the present invention is illustrated in FIGS. 1-5. Cassette 10, as shown, comprises housing 12, adapter plate 14, radius limiter 16, splice tray 18, splice tray cover 20, and housing cover 22. Illustrated cassette 10 is an exemplary configuration and use of the various illustrated components and features is optional and depends on the particular application for cassette 10.

Figure 1:
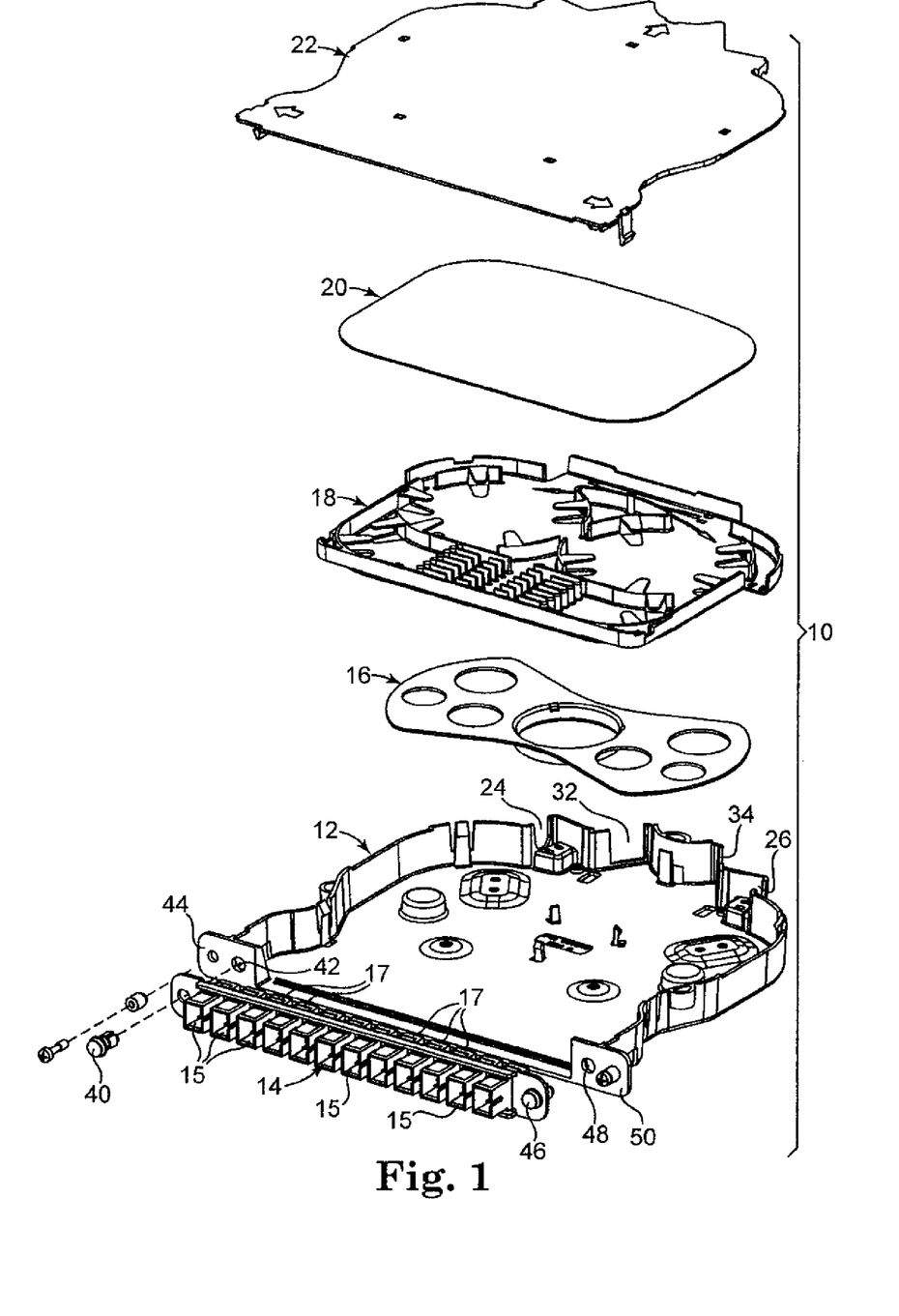
FIG. 1 is an exploded perspective view of an exemplary fiber management cassette in accordance with the present invention showing in particular a housing, adapter plate, radius limiter, optional splice tray, optional splice tray cover, and housing cover.

In use, one or more fiber optic cables comprising plural individual fibers is provided to cassette 10. Such fiber optic cable is broken out to (distributed as) individual fibers within cassette 10. Minimum bend radius specifications for such fibers can be maintained by cassette 10 such as by using radius limiter 16, for example. Cassette 10 can also facilitate splicing to adapter plate 14, which provides plural connectors 15 (twelve, as illustrated) for connecting to the individual fibers of the fiber optic cable provided to cassette 10.

Optionally, various optical components such as splitters, couplers, WDM's, CWDM's, DWDM's, and/or other desired optical components can be operatively positioned within cassette 10. Cassette 10 advantageously functions as a fiber management device and an optical component chassis or hybrid chassis that supports both a predetermined number of terminated ports and optical component hardware. Higher port counts of splitters such as 1×16, 1×32, and 1×64 split counts are advantageously supported in 2, 3, and 6 high cassettes 10.

Advantageously, cassette 10 is modular and individual components of cassette 10 functionally nest with each other for easy reliable assembly, disassembly, and/or maintenance. Moreover, cassette 10 preferably utilizes resilient connections, such as snap-fit connections, for example, which provides the ability to assemble and disassemble cassette 10 with minimal or no tools and/or fasteners. Conventional connecting and attaching techniques such as those using screws, bolts, adhesives, welding, interference fits, and the like may be used if desired but can advantageously be avoided in accordance with the present invention.

Advantageously, housing 12, radius limiter 16, splice tray 18, splice tray cover 20, and housing cover 22 of cassette 10 preferably comprise substantially clear plastic or the like allowing for a quick and easy first-step troubleshooting of unacceptable light conditions. By clear it is meant that the material used for cassette 10 is at least partially transmissive of a desired wavelength or range of wavelengths usable for identifying problems with fibers within cassette 10 such as breaks, fractures, cracks, or other unacceptable conditions. In a preferred embodiment, cassette 10 comprises plastic that is at least partially transmissive of visible light so problems with fibers inside cassette 10 can be visibly identified without opening cassette 10. In one preferred embodiment splice tray 18 is configured to be substantially opaque while housing 12 and housing cover 22 are clear. By substantially opaque it is meant that the material is not transmissive of a desired wavelength or range of wavelengths usable for identifying problems with fibers within cassette 10. Preferably, splice tray 18 is made of material that makes it easier to see an unacceptable condition of an optical fiber within cassette 10 such as a break or crack or the like by providing contrast between a light signal in such optical fiber and splice tray 18. As an example, colored plastic can be used such as black, blue, brown, or white, to make it easier to see an unacceptable optical fiber condition within cassette 10 when being tested for such conditions. In this way, because housing 12 and housing cover 22 are clear, troubleshooting can be performed without having to open the cassette to reveal the internal contents. Components of cassette 10 may also be color coded in any desired way to aid in quickly identifying such components. For example, in one embodiment, radius limiter 16 is made from blue plastic.

Cassette 10 also preferably comprises ruggedized plastic components suitable for harsh outside plant temperature and environmental conditions such as for use in outside plant cabinets for FTTx applications. Fiber to the home, business, premise, etc. is often called FTTH, FTTP where FTTx is a generic term for all end-points of an all fiber network to an end user. Advantageously, cassette 10, because of its modularity, can be used from central office to outside plant thereby reducing the learning curve and service turn-up time due to familiarity of cassette 10 throughout the network.

Figures 2, 3:
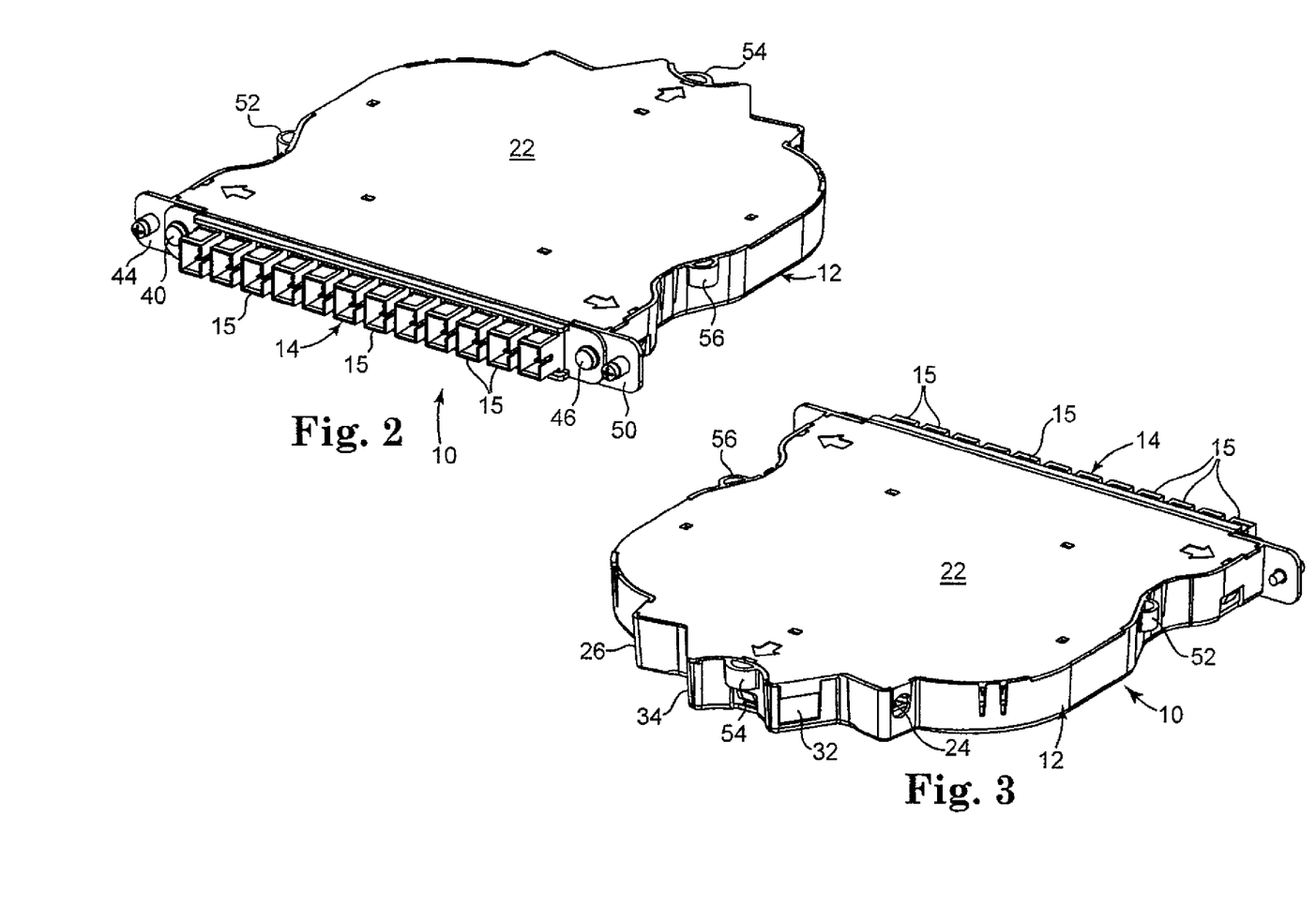
FIG. 2 is a top front perspective view of an exemplary cassette in accordance with the present invention.
FIG. 3 is a top rear perspective view of the cassette of FIG. 2.
Figures 4, 5:
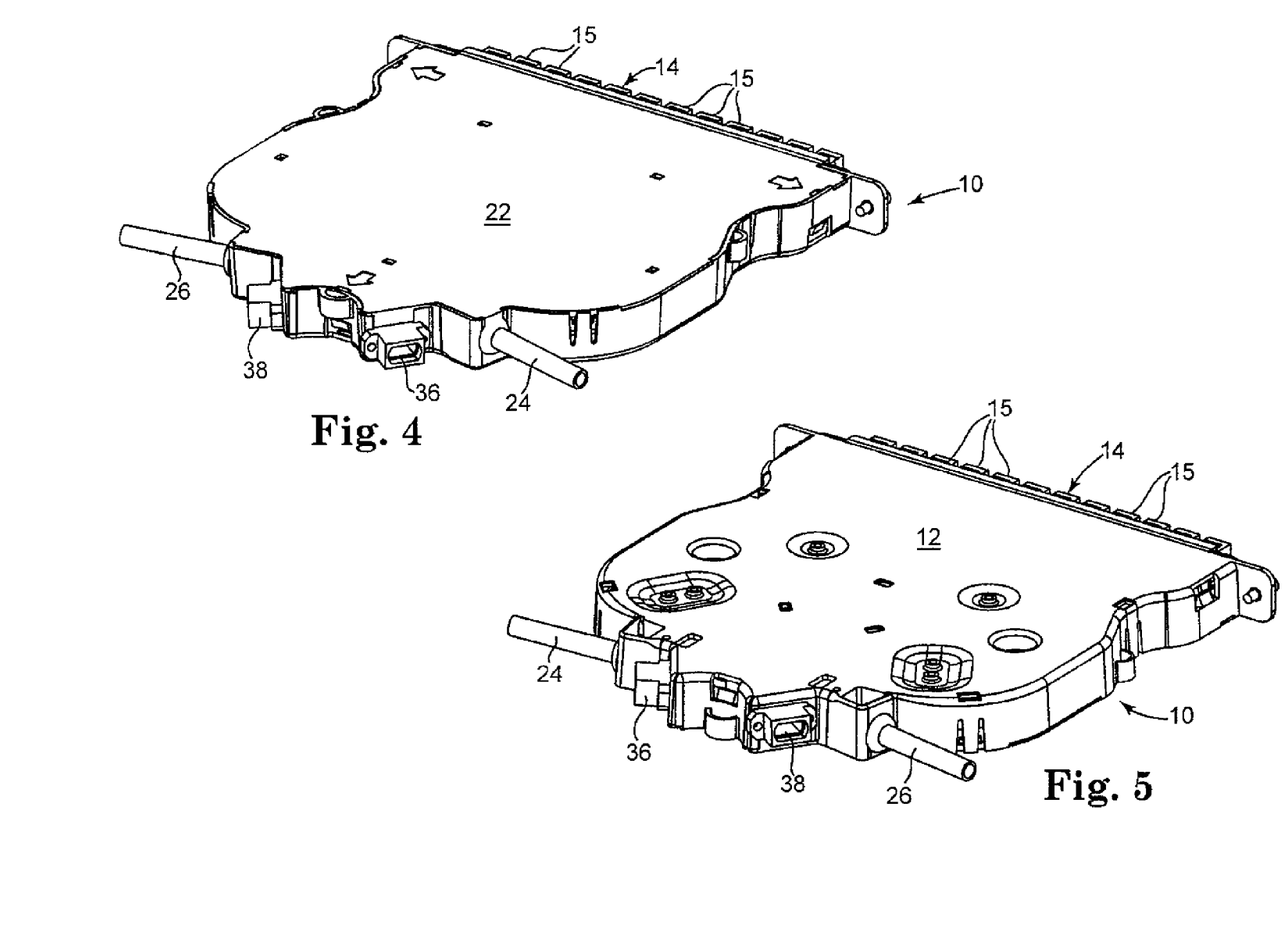
FIG. 4 is a top rear perspective view of another exemplary cassette in accordance with the present invention.
FIG. 5 is a bottom rear perspective view of the cassette of FIG. 4.

One or more fiber optic cables (not shown) having plural fibers to be managed by cassette 10 and distributed by adapter plate 14 can be provided to cassette 10 using openings 24 and 26 as shown in FIG. 3. Openings 24 and 26 are preferably provided at opposite sides of cassette 10, as illustrated, which provides easy access to one or both sides of cassette 10 depending on how the cassette is used. Openings 24 and 26 can be used for entry and/or exit of fiber optic cables. Referring to FIGS. 4 and 5, exemplary strain relief tubes, 28 and 30, are illustrated as operatively attached to cassette 10 at openings, 24 and 26, respectively. However, any desired grommets, clamps, and/or strain relief can be used to provide a fiber optic cable to cassette 10 using openings 24 and 26.

One or more fiber optic cables (not shown) having plural fibers to be managed by cassette 10 and distributed by adapter plate 14 can also be provided to cassette 10 using openings, 32 and 34, as shown in FIG. 3. Openings, 32 and 34, are preferably designed to receive connectors that can be used for plug-n-play applications where a fiber optic cable to be distributed using cassette 10 comprise a suitable connector at an end of the fiber optic cable. Referring to FIGS. 4 and 5, exemplary connectors, 36 and 38, are illustrated as operatively attached to cassette 10 at openings, 32 and 34, respectively. Connectors, 32 and 34, may comprise connectors such as those referred to as MPT or MPO. MTP and MPO refer to multi-fiber optical ribbon connectors where a 4, 8, or 12, etc. fiber ribbon is terminated into a single connector. The application of MTP/MPO provides plug-n-play functionality. A fiber assembly of a 12-fiber MTP connector broke out to individual 12-fiber circuits terminated to adapter plate 14 of cassette 10 allows a user to bring a pre-terminated MTP/MPO assembly to cassette 10 and simply plug into the MTP/MPO adapter (see reference numerals 36 and 38 in FIGS. 4 and 5) integrated with housing 12.

Referring to FIG. 1 in particular, adapter plate 14 comprises connectors 17, which function to provide a connection between adapter plate 14 and fibers within cassette 10 and connectors 15, which function to connect fibers within cassette 10 and other desired components. Adapter plate 14 may comprise any desired number of connections. Adaptor plate 14 also comprises fastener 40 used to attach adaptor plate 14 to opening 42 in flange 44 of housing 12 and fastener 46 used to attach adapter plate 14 to opening 48 in flange 50 of housing 12. Fasteners 40 and 46 preferably use resilient connections to attach adapter plate 14 to housing 12. A resilient connection preferably comprises a flexible elastic portion that can flex or deflect to engage with a corresponding portion, which is typically fixed by may a flexible portion as well. Resilient connections can preferably be engaged and disengaged, such as for assembly and disassembly of components, with minimal or no tools and/or fasteners. Conventional fasteners may be used, however, such as screws and bolts and the like.

Further referring to FIGS. 2 and 3, cassette 10 preferably comprises anchor points 52, 53, and 54. Anchor points 52, 53, and 54 can be used to gang or group plural cassettes together into one block for easier installation and shipping. For example, a 288-port cabinet (or any other size cabinet) is often initially loaded with 144 ports (i.e., less than the capacity of the cabinet) of patch only. If in the future there is a need for more fiber in the cabinet, a pre-terminated 144 OSP assembly (any desired number can be used) that is loaded into 12-cassettes can be used. The twelve cassettes can be ganged together advantageously eliminating the problem of 12-cassettes tethered to 12-different legs of a 144-assembly moving around and possibly causing damage to fibers. This allows the 144 to be terminated into a solid block for easier installation and handling.

Figures 6, 7, 8:
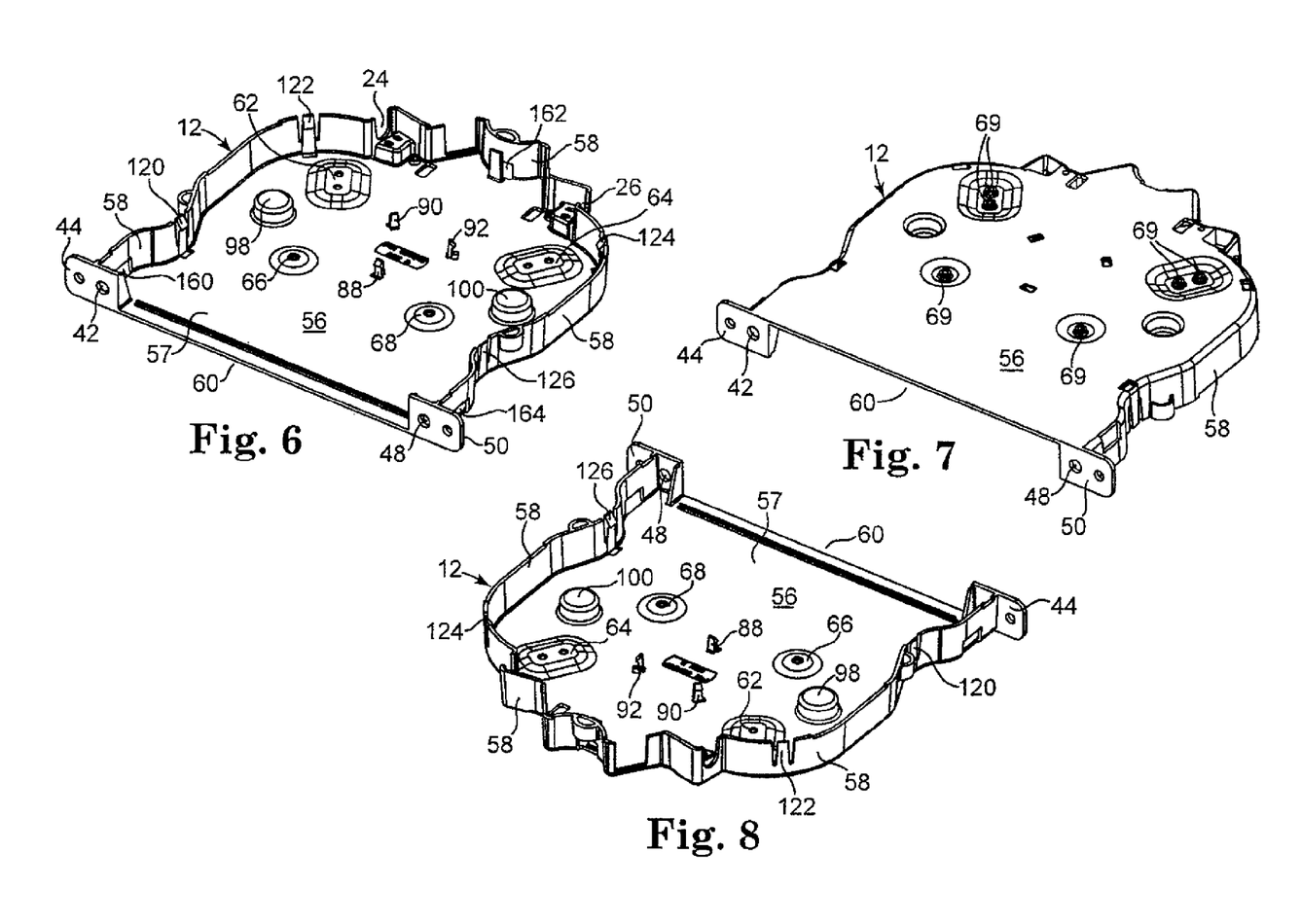
FIG. 6 is a top front perspective view of an exemplary housing for a cassette in accordance with the present invention.
FIG. 7 is a bottom front perspective view of the housing of FIG. 6.
FIG. 8 is a top rear perspective view of the housing of FIG. 6.

Now referring to FIGS. 6, 7, and 8 housing 12 is shown in greater detail. Housing 12 comprises base portion 56, sidewall 58, and opening 60 for receiving adapter plate 14. Base portion 56 preferably comprises mounting regions, 62, 64, 68, and 66, which as illustrated comprise raised regions or standoffs as viewed from the inside of housing 12. Mounting regions, 62, 64, 66, and 68 function to provide attachment points for optical components, if used. Mounting regions 62, 64, 66, and 68 preferably comprise bosses 69 that extend from the bottom surface of housing 12 (See FIG. 7) and that provide additional material for a screw used to attach an optical component to housing 12.

Any combination of mounting regions 62, 64, 66, and 68 can be used to mount desired optical components. In some embodiments, a bracket (not shown) is attached to mounting regions, 62 and 64, and the bracket is used to hold an optical component. In other embodiments, an optical component is directly attached to mounting regions, 62 and 64. In other embodiments, mounting regions 62, 64, 66 and 68, are preferably used for large optical components that have a higher number of input/output legs and are packaged in a 10 mm×80 mm×100 mm package.

Figures 9, 10:
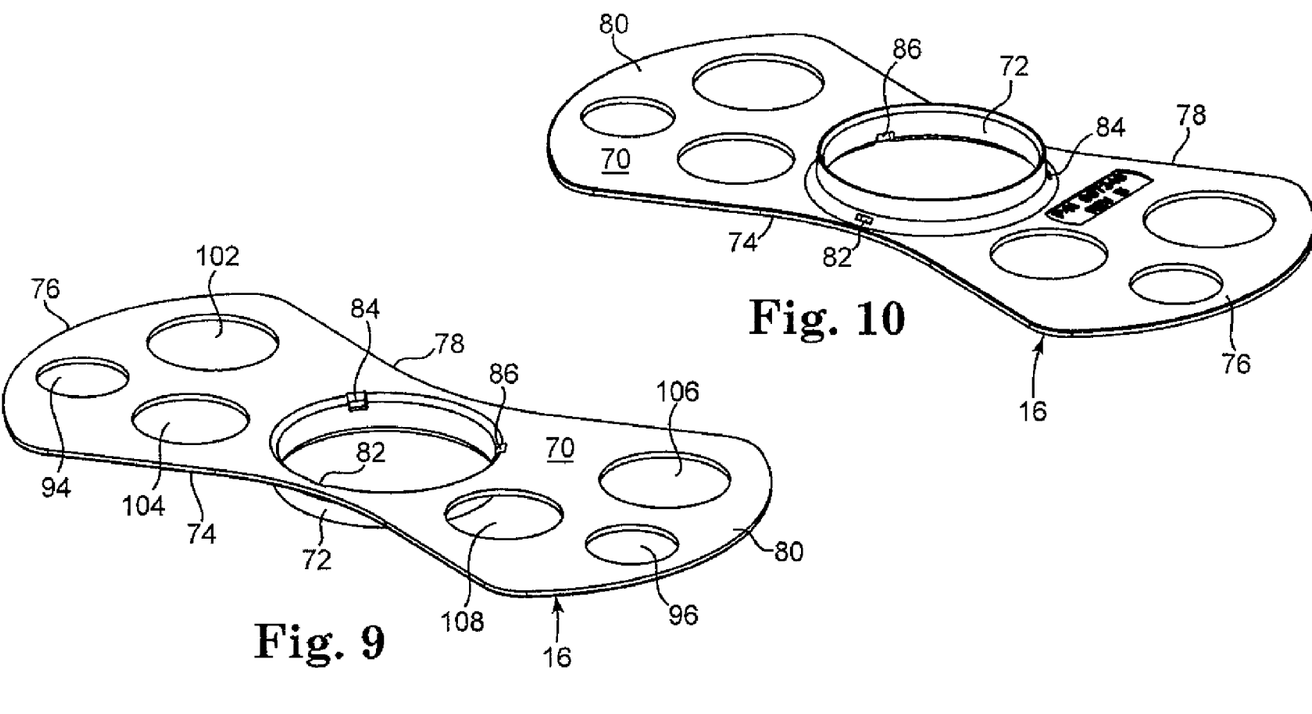
FIG. 9 is a top perspective view of an exemplary radius limiter in accordance with the present invention.
FIG. 10 is a bottom perspective view of the radius limiter of FIG. 9.

Radius limiter is shown in greater detail in FIGS. 9 and 10. As shown, radius limiter comprises base portion 70 and central boss 72 (central hub). Base portion 70 preferably comprises arcuate sides 74, 76, 78, and 80, which generally provide a bow-tie shape. Central boss 72 comprises notches 82, 84, and 86 that mate with arms 88, 90, and 92 of housing 12, respectively, when assembled in housing 12 and can best be seen in FIGS. 6 and 8. Arms 88, 90, and 92 preferably comprise hook portions at the end of each arm that engage with notches 82, 84, and 86, when assembled. Preferably, arms 88, 90, and 92 are releasable for disassembly. Arms 88, 90, and 92 are preferably resilient and flex to engage with notches 82, 84, and 86 when assembled. Advantageously, the combination of arms 88, 90, and 92 and notches 82, 84, and 86 provides easy assembly and disassembly of radius limiter 16 with housing 12. Conventional fasteners, adhesives, interference fits, and/or other snap-fit structures may be used.

Central boss 72 of radius limiter 16 is preferably designed with a radius that corresponds with a predetermined minimum bend radius for a particular fiber being managed by cassette 10. Also, radius limiter is preferably designed to be large enough to hold a pre-terminated assembly captive to surface 57 of housing 12 (see FIGS. 6 and 8). When adapter plate 14 is exercised from the front of cassette 10, radius limiter 16 functions to prevent fibers from having an unacceptable radius or bend. Radius limiter 16 also functions to prevent fibers from jumping over radius limiter 16 and possibly creating unacceptable microbends.

Radius limiter 16 also comprises openings, 94 and 96, that preferably mate with bosses, 98 and 100, respectively, of housing 12 when assembled. Radius limiter 16 also includes optional openings 102, 104, 106, and 108, as shown, which minimize the amount of material needed to form radius limiter 16.

Figures 11, 12, 13:
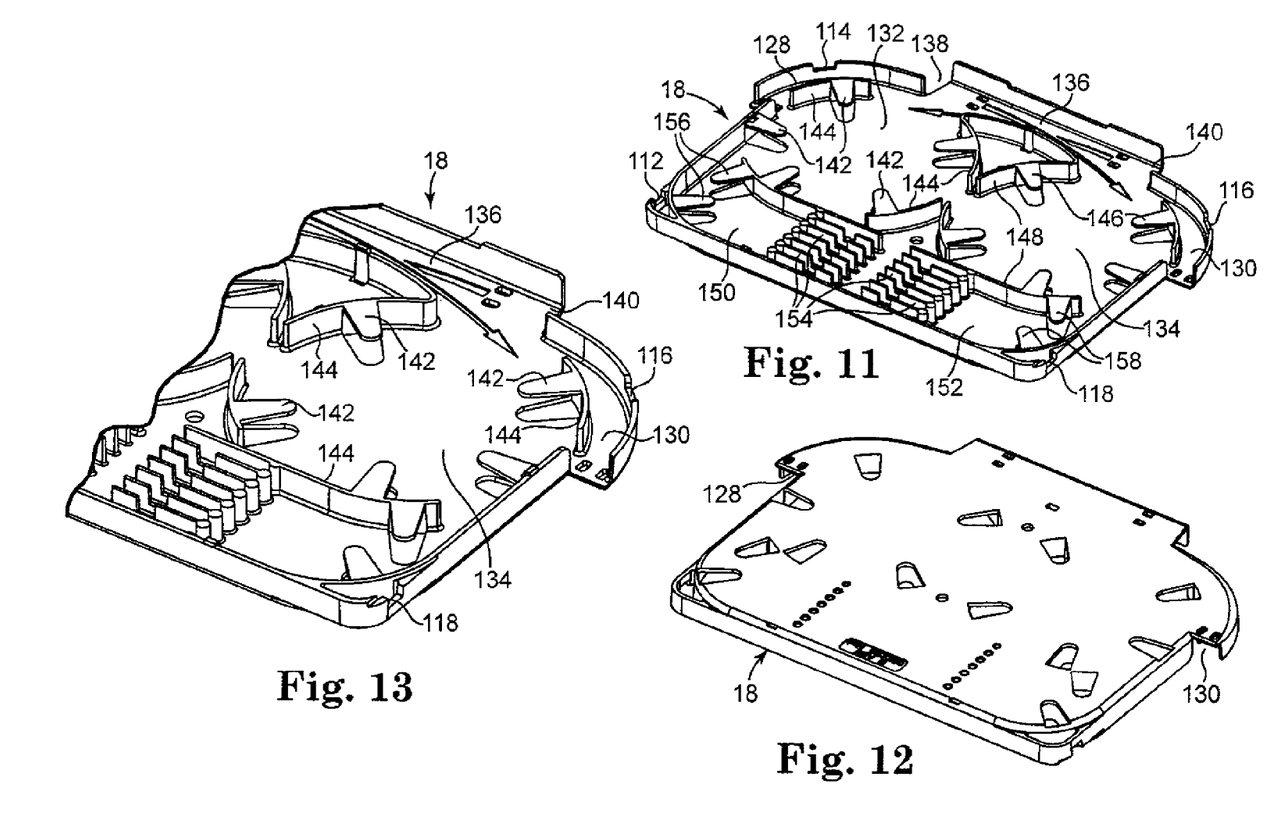
FIG. 11 is a top front perspective view of an exemplary splice tray in accordance with the present invention.
FIG. 12 is a bottom front perspective view of the splice tray of FIG. 11.
FIG. 13 is a detail view of the splice tray of FIG. 11 showing in particular a fiber nest and splice channels.
Figure 14:
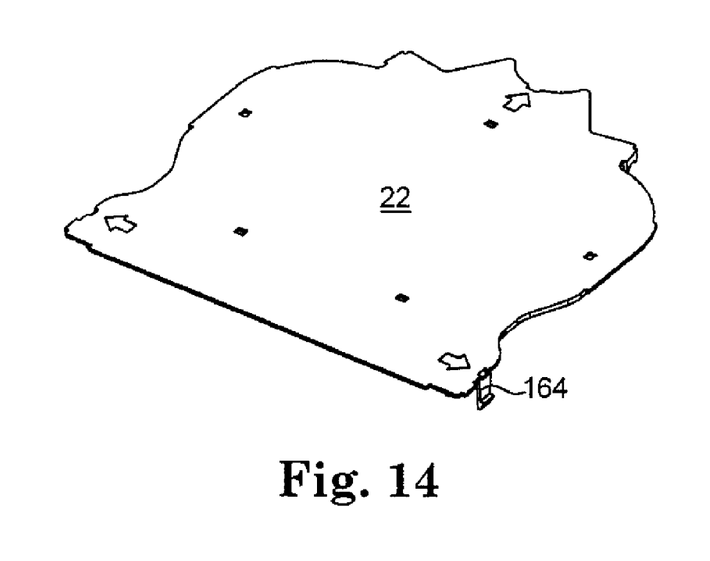
FIG. 14 is a top front perspective view of an exemplary housing cover in accordance with the present invention.
Figure 15:
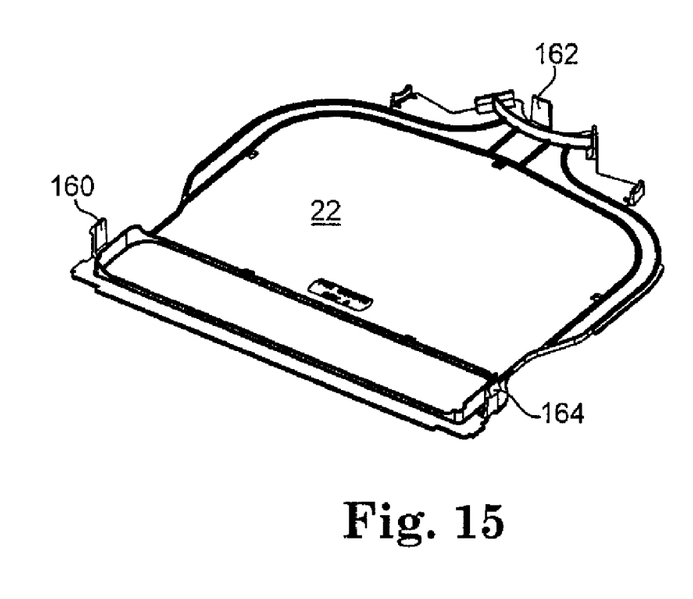
FIG. 15 is a bottom front perspective view of the housing cover of FIG. 14.

Splice tray 18 is shown in greater detail in FIGS. 11-13. Splice tray 18 comprises base portion 110 that functions as a second level for fiber management within cassette 10. As shown, base portion 110 provides a second level that is spaced apart from the first level (base 56 of housing) in that such surfaces are generally parallel. Splice tray 18 comprises preferably comprises notches 112, 114, 116, and 118 that engage with resilient releasable arms 120, 122, 124, and 126 to attach splice tray 18 to housing 12.

Splice tray 18 also includes raceways 128 and 130 that can be used to guide fibers within cassette 10 between the first level (base 56 of housing 12) and the second level (splice tray 18) of cassette 10. Raceways 128 and 130 function as ramps and guides to help transition optical fiber between the first and second levels.

Further referring to FIG. 11 in particular, splice tray 18 comprises channel 136 and openings, 138 and 140, that function as entrances and/or exits for a fiber optic cable to enter or exit channel 136. Opening 130 receives a fiber optic cable provided by opening 24 and opening 132 receives a fiber optic cable provided by notch 26. Also, fiber nests, 132 and 134, are preferably provided for storing and managing fiber within cassette 10. Fiber nest 132 preferably comprises tabs 142 that extend outwardly from surfaces 144 to partially define a radial channel for helping to contain coiled fiber within splice tray 18. Similarly, fiber nest 134 preferably comprises tabs 146 that extend outwardly from surfaces 148 to partially define a radial channel for helping to contain coiled fiber within splice tray 18.

Splice tray 18 also includes regions, 150 and 152, and splice channels 154. Region 150 preferably comprises tabs 156 and functions to guide fiber from nest 132 to splice channels 154 or from splice channels 154 to fiber nest 132. Likewise, region 152 preferably comprises tabs 158 and functions to guide fiber from nest 134 to splice channels 154 or from splice channels 154 to fiber nest 134. Splice channels 154 function to hold splicing tubes both vertical and horizontally. In the illustrated exemplary embodiment, splice tray comprises six channels 154, which hold twelve splicing tubes (two in each channel 154). When two fibers are spliced together, a steel tube that protects the delicate splice point preferably encapsulates the splice point. Heat shrink is then preferably applied for moisture/humidity protection and this tube is then pressed down into channels 154. There are preferably two spaced apart banks of channels 154 so that a splicing tube can be accessed with fingers. Optional cover 20 (see FIG. 1) may be used for added protection and retention of fibers within splice tray 18 if desired.

Housing cover 22 is shown in FIGS. 11-13. Housing cover 22 preferably comprises resilient releasable arms 160, 162, and 164 that engage with notches 166, 168, and 170, respectively, of housing 12 as can best be seen in FIGS. 6-8. Housing cover 22 also preferably completes the adapter housing for the MTP/MPO adapters (see reference numerals 36 and 38 in FIGS. 4 and 5) of cassette 10. Housing cover 22 also preferably engages with strain relief tubes 24 and 26 (see FIGS. 4 and 5) to provide a seal.

Figure 16:
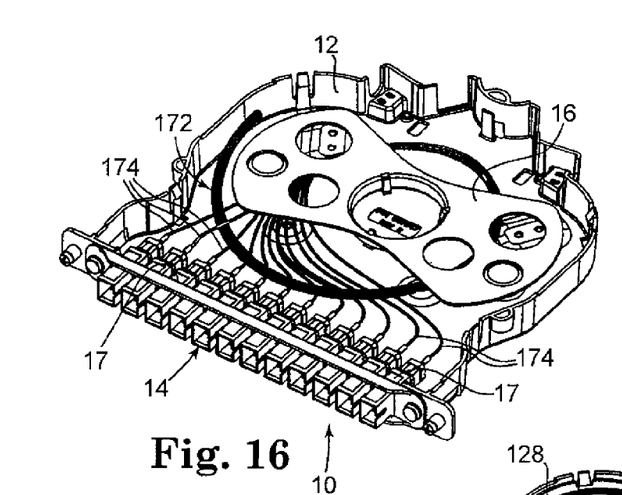
FIG. 16 is a front perspective view of a portion of another exemplary cassette in accordance with present invention showing in particular a housing and radius limiter nested in the housing and plural fibers (partial view) connected to an adapter plate and looped around the radius limiter. The housing functions as a first (lower) level of the cassette for fiber management.
Figure 17:
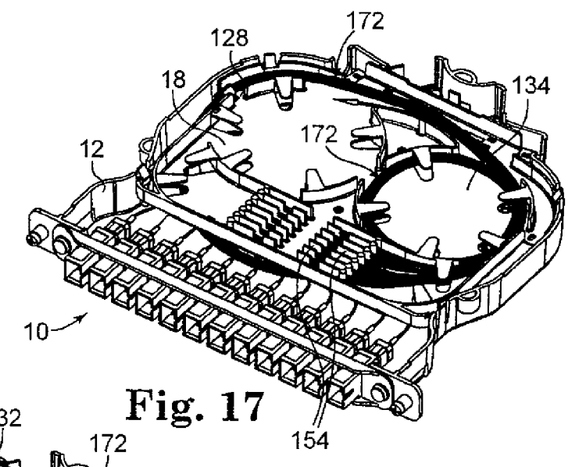
FIG. 17 is a front perspective view of the cassette of FIG. 16 showing in particular a splice tray nested in the housing and the fibers from the first level positioned on a ramp of the splice tray, looped in a first fiber nest of the splice tray, and positioned in splice channels of the splice tray. The splice tray functions as a second (upper) level of the cassette for fiber management.
Figure 18:
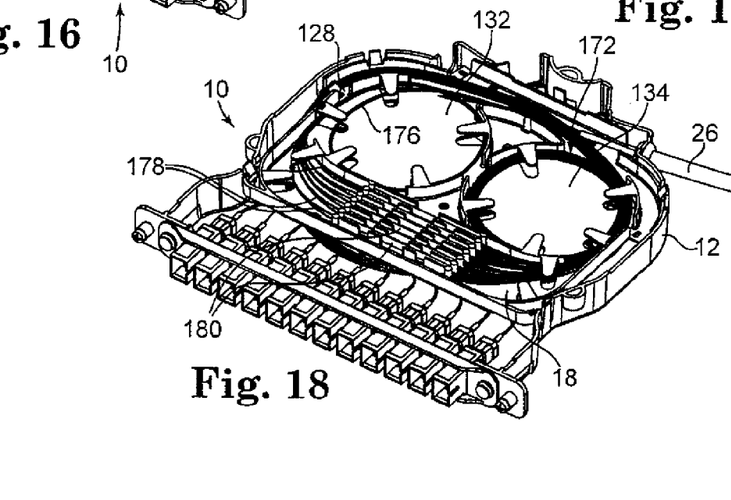
FIG. 18 is a front perspective view of the cassettes of FIGS. 16 and 17 showing in particular a fiber optic feed cable entering the cassette and looped in a second fiber nest of the splice tray wherein the fiber optic cable is broken out into plural fiber optics which are positioned in the splice channels of the splice tray.

In FIGS. 16-18 an exemplary configuration for cassette 10 is illustrated. Inside cassette 10 fibers 174 from a sub-assembly 172 comprising adapter plate 14 and terminated fibers 174 connected to connectors 17 are slack stored on the lower level of cassette 10 and bend radius protected using radius limiter 16. For patch only configurations, sub-assembly 172 is preferably routed and tied off in front of an exit point. For patch and splice configurations (illustrated), sub-assembly 172 is preferably tight buffered and is routed from the lower level of cassette 10 to the second level of the cassette 10 via splice tray ramp 128 and further slack stored within fiber nest 134 as shown in FIG. 17. Ends of fibers 174 are positioned in splice channels 154 for later splicing as shown in FIG. 17 (preferably two for each channel 154). Up to one half meter of slack storage is available from the upper and lower levels of the illustrated exemplary cassette 10. In the field, buffer tube 176 is routed into the cassette 10 secured with strain relief tube 26, routed, slack stored in fiber nest 132, and broken out into individual fibers 178 that are spliced with fibers 174 to form splices 180 that are positioned in splice channels 154 of splice tray 18.

In an exemplary patch and splice application, cassette 10 is preferably pre-loaded with a 12-fiber assembly of 900 micron individual fiber circuits terminated to twelve connectors that are mated to connectors 17 on adapter plate 14. A user would then bring an OSP or IFC (intra-facility cable) cable that is either a buffer tube (OSP) or subunit (IFC) of 12-fibers that has been broke from an overall jacket housing X number of subunits or buffer tubes. For example, a 144 would have 12 subunits or buffer tubes inside an overall jacket. A 96 would have eight, etc. This cable is then spliced to the pre-terminated, pre-loaded assembly inside cassette 10 in splice tray 18. An exemplary patch only application is where the splicing is occurring outside of cassette 10 inside the cabinet, on the frame, or off the frame. The pre-terminated, pre-loaded assembly would have a stub length that is much longer, often one hundred feet to five hundred or more feet or whatever distance is needed to reach the splicing area. The multi-fiber assembly is broke out and terminated to the number of cassettes equal to the total fiber count of the cable divided by twelve. For example, a 144 pre-terminated assembly loads into twelve cassettes.

Applications and Scenarios

1. Patch Only

Patch only applications for cassette 10 preferably utilize housing 12, radius limiter 16 (for radius protection when adapter plate 14 is exercised), and housing cover 22. Adapter plate 14 preferably supports industry standard connectors on interconnect field of cassette 10. The feeder field supports a variety of cable constructions in addition to multi-fiber ribbon connector MPT/MPO. The feeder field is the fiber optics coming from a central office or where content is being generated and then sent downstream to a patch panel or cabinet in the field. The distribution field or network points downstream to the end user or subscriber such as a home or business. The interconnect functions occur when the feeder network is physically connected or mated to the distribution network, i.e., through cassettes 10. For example, a cassette 10 that has been terminated with a cable that is coming from a central office would have a patch cord mated to one of connectors 15 of which the other end is mated to another connector 15 on a different cassette 10 that has been terminated with a cable that is pointing downstream to the end user.

For patch only configurations cassette 10 is preferably pre-loaded with tight-buffered constructions including ribbon and breakout style cables. Multi-fiber counts above twelve can be supported with multi-cassette configurations. Cassette 10 supports plural entry-exit points and cable tie-offs including integrated grommet strain-relief for delicate constructions.

2. Patch and Splice

Patch and splice applications for cassette 10 preferably utilizes housing 12, radius limiter 16, splice tray 18, and housing cover 22. Advantageously, cassette 10 does not restrict space when splicing is required. Cassette 10 also eliminates the need for twelve-fiber tight-buffered slack storage that requires additional space outside of traditional fiber management products. Cassette 10 allows for up to one meter of tight-buffered 900-micron assemblies pre-terminated and pre-loaded and slack-stored inside of cassette 10. Preferably, outside plant cable is brought directly to the cassette 10 for splicing. Slack storage space for buffer-tube-only applications minimizes space needed for storage and eliminates congestion and cable lock-in as tight buffered cables are preferably not stored in the same routing space. Advantageously, space allocation can be done in advance of arrival of splicing technicians. Cassette 10 can be handled the same was as a traditional splice tray is handled but with added benefit of a terminated assembly attached to the product. Cassette 10 also supports traditional off-frame splicing and on-frame splicing applications where separate splice decks are used.

3. Plug and Play

For added modularity cassette 10 preferably supports MPO assemblies and adapters on the distribution field side of cassette 10. Twelve industry standard terminations to twelve-fiber MPO ribbon terminations inside cassette 10 provide a fully self-contained interconnect environment for modularity. MPO pre-terminated distribution or outside plant cables in all constructions and fiber counts are supported allowing for a build-a-panel environment that allows for quicker delivery times and rapid service turn-up in the field.

4. Optical Components and Chassis

Cassette 10 supports optical components such as FBT (fused biconic taper), planar splitters, and wave division multiplexers for both coarse and densewave applications. Single wide cassettes support optical components comprising twelve combined input/output interfaces. Double and triple wide cassettes support any configuration or applications that exceeds twelve combined input/output interfaces.

Applications/Configurations

1. Central Office/Head-End

Off-frame splicing supports up to 1728 of terminate in a standard seven-foot frame along with lower trough for slack take up or cross over capabilities. The solution utilizes a multi-fiber cable of any construction for inside and outside plant and terminates such cable into subunits or buffers tubes into twelve-fiber cassettes in blocks equal to the fiber-counts desired up to 144 ports. Tail lengths are predetermined and pulled to an off-frame splicing area after panels have been installed in a traditional installation.

Cassettes can be configured for rear load and assemblies terminated as patch cords for tie-panels in a cross-connect environment or when direct mateability is desired to the active gear. Preferably, cassettes are preloaded with pre-determined multi-fiber cable and provided as a standalone product.

Traditional on-frame splicing to a separate splice deck is supported with twelve-fiber tight buffered cable of five meters and are pre-terminated and preloaded into cassettes which are loaded to a desired port count. Tails are preferably routed to the splice deck in the field or pre-routed and provided as a loaded-frame solution.

For on-frame splicing, twelve pre-terminated tight buffered assemblies are preferably loaded into cassettes and slack stored on a first floor of a cassette and then routed up to a second floor and onto a splice tray where it is met with incoming/outgoing outside plant fibers. Slack storage of pre-terminated assembly is accomplished inside of a cassette and outside storage of tight buffered and jacketed cable is advantageously eliminated. Nested splice trays in accordance with the present invention support both ribbon and loose-tube constructions. One half meter of 900 micron storage and one meter of 250-micron loose-tube cable is supported by the exemplary illustrated cassette 10. Buffer slack storage can be accommodated onto rear fiber management and is consistent in application from 12 to 288 ports.

Cassette 10 allows equal densities for patch only and patch and splice applications.

The present invention has now been described with reference to several embodiments thereof. The entire disclosure of any patent or patent application identified herein is hereby incorporated by reference. The foregoing detailed description and examples have been given for clarity of understanding only. No unnecessary limitations are to be understood therefrom. It will be apparent to those skilled in the art that many changes can be made in the embodiments described without departing from the scope of the invention. Thus, the scope of the present invention should not be limited to the structures described herein, but only by the structures described by the language of the claims and the equivalents of those structures.

What is claimed is:

1. A modular optical fiber management cassette comprising:
    a housing comprising a surface that provides a first level of fiber management and at least one opening that allows entry of an optical fiber cable into the housing;
    an adaptor plate resiliently connected to the housing and comprising a plurality of optical fiber connectors, the adapter plate being releasable from the housing and providing access to both sides of the adapter plate;
    a radius limiter nested with and resiliently connected to the housing, the radius limiter comprising a base portion and central hub;
    a splice tray nested with and resiliently connected to the housing, the splice tray comprising a plurality of splice channels and at least one fiber nest that provides storage of coiled optical fiber, the splice tray comprising a surface that provides a second level of fiber management spaced from the first level of fiber management; and
    a housing cover resiliently connected to the housing.

2. The cassette of claim 1, wherein the housing comprises substantially clear plastic.

3. The cassette of claim 1, wherein the housing comprises a mounting region for attaching an optical component to the housing.

4. The cassette of claim 1, wherein the radius limiter comprises substantially opaque plastic.

5. The cassette of claim 4, wherein the radius limiter comprises blue plastic.

6. The cassette of claim 1, wherein the central hub of the radius limiter has a radius greater than a critical bend radius of optical fiber to be managed by the cassette.

7. The cassette of claim 1, wherein the base portion of the radius limiter comprises arcuate sides.

8. The cassette of claim 1, wherein the splice tray comprises substantially opaque plastic.

9. The cassette of claim 8, wherein the splice tray comprises black plastic.

10. The cassette of claim 1, wherein the splice tray comprises a raceway that guides optical fiber cable between the first level of fiber management and the second level of fiber management.

11. The cassette of claim 1, further comprising a splice tray cover distinct from the housing cover.

12. The cassette of claim 1, wherein the housing cover comprises substantially clear plastic.

13. The cassette of claim 1, in combination with optical fiber.

14. A method of optical fiber management comprising:
    providing the modular optical fiber management cassette recited in claim 1;
    configuring the modular optical fiber management cassette for one of patch-only, patch and splice, and optical component use;
    connecting a feed cable to the optical fiber management cassette; and
    distributing the feed cable with the adaptor plate.

15. The method of claim 14, comprising testing an optical fiber within the cassette by providing a signal to the optical fiber and optically viewing the optical fiber without removing the housing cover from the housing.

16. A modular optical fiber management cassette comprising:
    a clear plastic housing comprising a surface that provides a first level of fiber management and at least one opening that allows entry of an optical fiber cable into the housing;

an adaptor plate resiliently connected to the housing and comprising a plurality of optical fiber connectors, the adapter plate being releasable from the housing and providing access to both sides of the adapter plate;

a radius limiter nested with and resiliently connected to the housing, the radius limiter comprising a base portion and central hub; and a clear plastic housing cover resiliently connected to the housing, wherein both sides of the adapter plate are accessible without removing the clear plastic housing cover when the adapter plate is exercised from a front of the modular optical fiber management cassette.

17. The cassette of claim 16, wherein the housing, adapter plate, radius limiter, and housing cover can be assembled and disassembled without the use of separate fasteners.

18. The cassette of claim 16, further comprising a splice tray nested with and resiliently connected to the housing, the splice tray comprising a plurality of splice channels and at least one fiber nest that provides storage of coiled optical fiber, the splice tray comprising a surface that provides a second level of fiber management spaced from the first level of fiber management.

19. The cassette of claim 18, wherein the splice tray comprises first and second spaced apart fiber nests that provide storage of coiled optical fiber.

20. A modular optical fiber management cassette comprising:

a clear plastic housing comprising at least one opening that allows entry of an optical fiber cable into the housing and a plurality of mounting regions for attaching an optical component to the housing;

an adaptor plate resiliently connected to the housing and comprising a plurality of optical fiber connectors, the adapter plate being releasable from the housing and providing access to both sides of the adapter plate;

an optical component attached to the plurality of mounting regions; and a clear plastic housing cover resiliently connected to the housing.

* * * * *